(12) United States Patent
Ibrahim et al.

(10) Patent No.: US 10,494,302 B1
(45) Date of Patent: Dec. 3, 2019

(54) HEAVYWEIGHT CONCRETE CONTAINING STEEL SLAG

(71) Applicant: King Fahd University of Petroleum and Minerals, Dhahran (SA)

(72) Inventors: Mohammed Ibrahim, Dhahran (SA); Mohammed Salihu Barry, Dhahran (SA); Luai M. Alhems, Dhahran (SA); Muhammad Kalimur Rahman, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 41 days.

(21) Appl. No.: 16/032,569

(22) Filed: Jul. 11, 2018

(51) Int. Cl.
*C04B 28/08* (2006.01)
*C04B 14/36* (2006.01)
*B28B 11/24* (2006.01)
*B28B 1/14* (2006.01)

(52) U.S. Cl.
CPC ............ *C04B 28/082* (2013.01); *B28B 1/14* (2013.01); *B28B 11/245* (2013.01); *C04B 14/36* (2013.01); *C04B 2201/20* (2013.01); *C04B 2201/50* (2013.01)

(58) Field of Classification Search
CPC ... C04B 14/36; C04B 28/082; C04B 2201/20; C04B 2201/50; B28B 1/14; B28B 11/245
See application file for complete search history.

(56) References Cited

U.S. PATENT DOCUMENTS

| | | | |
|---|---|---|---|
| 4,164,426 A | 8/1979 | Sinka et al. | |
| 7,537,655 B2 * | 5/2009 | Abbate | C04B 18/027 106/713 |
| 8,221,541 B2 * | 7/2012 | Koh | C04B 28/04 106/714 |
| 8,662,111 B2 * | 3/2014 | Al-Mehthel | C04B 28/02 106/714 |
| 9,322,491 B2 | 4/2016 | Al-Meththel et al. | |
| 2012/0137933 A1 | 6/2012 | Koh et al. | |

FOREIGN PATENT DOCUMENTS

| | | | |
|---|---|---|---|
| CN | 104016636 A | * | 9/2014 |
| CN | 105731909 A | * | 7/2016 |
| CN | 105731909 A | | 7/2016 |
| CN | 106145785 A | | 11/2016 |
| CN | 106242431 A | * | 12/2016 |
| CN | 107902997 A | | 4/2018 |

OTHER PUBLICATIONS

Ozen, et al. ; Properties of Heavyweight Concrete for Structural and radiation Shielding Purposes ; Arabian Journal for Science and Engineering ; Apr. 2016 ; 13 pages.

Sika Group ; Heavyweight Concrete ; Sika AG ; May 4, 2018 ; 4 pages.

The Constructor ; Heavyweight Aggregates for Production of Heavyweight Concrete ; The Constructor Civil Engineering Home ; May 4, 2018 ; 3 pages.

* cited by examiner

*Primary Examiner* — Anthony J Green

(74) *Attorney, Agent, or Firm* — Oblon, McClelland, Maier & Neustadt, L.L.P.

(57) ABSTRACT

A heavyweight concrete composition comprising cement, steel slag coarse particles, steel slag fine particles, and iron ore aggregate, a wet concrete slurry of water mixed with the heavyweight concrete composition, and a heavyweight concrete which is a cured form of the wet concrete slurry. In the present disclosure, sand, which is used in conventional concretes, is replaced with steel slag fine particles to produce a sand-free heavyweight concrete.

19 Claims, 1 Drawing Sheet

HEAVYWEIGHT CONCRETE CONTAINING STEEL SLAG

STATEMENT OF ACKNOWLEDGEMENT

This research work was supported by the Center for Engineering Research (CER) of Research Institute, King Fahd University of Petroleum and Minerals, Dhahran, Saudi Arabia.

BACKGROUND OF THE INVENTION

Technical Field

The present invention relates to a heavyweight concrete composition including cement, steel slag and iron ore, and a heavyweight concrete which is a cured form of a wet concrete slurry involving water and the heavyweight concrete composition.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Submarine pipelines are used to transport offshore and deep water oil and gas to storage facilities. In some cases, the cost of constructing and managing submarine pipelines is higher than that of oil drilling and producing. It is important to control the cost of pipelines in order to reduce the cost and management demands of installation.

A concrete heavyweight coating is an important component of a submarine pipeline. Concrete heavyweight coating is applied on an outer surface of pipes to add weight to counter the buoyancy forces present during installation and placement of submarine pipelines. Pipes are generally placed at the subsea level. These pipelines are most often placed at subsea level near loading and unloading docks in order to avoid collisions with incoming and outgoing ships. Furthermore, pipelines are weighted by concrete heavyweight coating to ensure that they are held in place and thus minimize stress on the pipe and pipe joints.

The unit weight of a concrete is an important parameter to consider during the selection of concrete for weighting the pipelines. Concrete utilized for this purpose is required to have a minimum unit weight of 190 pcf (3043 kg/m$^3$) and a minimum compressive strength of 4000 psi (28 MPa). Conventional concrete, which uses limestone and/or other natural aggregates as coarse aggregate and sand as fine aggregate, does not have sufficient unit weight (density) to be used as a heavyweight concrete coating.

In order to increase the density of a concrete, normal weight coarse aggregate may be fully replaced with iron ore with a higher specific gravity. However, iron ore is relatively expensive and is not readily available in many countries around the world. The price for imported iron ore is even higher. U.S. Pat. No. 8,662,111B2 discloses a concrete heavyweight coating with reduced cost, and desired density and strength that has up to 30% of iron ore replaced with industrial byproduct such as steel slag [Al-Mehthel M., Maslehuddin M., Hammad B., Al-Sharif Alaeddin A., Ibrahim M, (2014), Economical Heavy Concrete Weight Coating for Submarine Pipelines, U.S. Pat. No. 8,662,111, incorporated herein by reference in its entirety]. However, a large proportion of the coarse aggregate used in the US '111 concrete coating is iron ore and dune sand is used as fine aggregate in the concrete mix.

Parameters influencing the density and compressive strength of a heavyweight concrete coating for submarine pipelines include quantities and gradations of coarse and fine aggregates in the concrete mix. A proper selection of these parameters may enhance the particle packing in the mix thereby increasing the density and strength of the concrete. It is desirable to further reduce the usage of iron ore in a concrete mix to cut the cost of heavyweight coating of pipelines and meet minimum density and strength requirements.

In view of the forgoing, one objective of the present disclosure is to provide a heavyweight concrete composition comprising steel slag particles, particularly a heavyweight concrete composition with enhanced usage of steel slag and minimized iron ore content. Another objective of the present disclosure is to provide a heavyweight concrete with improved properties, which is a cured form of a wet concrete slurry containing the heavyweight concrete composition and water. An economical heavyweight concrete with adequate density and strength is thus provided by replacing a major proportion of iron ore with locally available industrial byproducts such as steel slag.

BRIEF SUMMARY OF THE INVENTION

According to a first aspect, the present disclosure relates to a heavyweight concrete composition involving (i) 8-15 wt % cement, (ii) 65-83 wt % steel slag, and (iii) 3-10 wt % of an iron ore coarse aggregate, each relative to a total weight of the heavyweight concrete composition. The steel slag is present in the heavyweight concrete composition as a mixture of steel slag coarse particles having a particle size of 2-10 mm and steel slag fine particles having a particle size of 0.1-1.5 mm. The iron ore coarse aggregate has a particle size of 3-7 mm.

In one embodiment, a weight ratio of the steel slag coarse particles to the steel slag fine particles ranges from 1.5:1 to 3:1.

In one embodiment, a weight ratio of the steel slag coarse particles to the iron ore coarse aggregate ranges from 4:1 to 20:1.

In one embodiment, a weight ratio of the steel slag fine particles to the iron ore coarse aggregates ranges from 2:1 to 10:1.

In one embodiment, the heavyweight concrete composition contains 45-55 wt % of the steel slag coarse particles, and 20-28 wt % of the steel slag fine particles, each relative to a total weight of the heavyweight concrete composition.

In one embodiment, the heavyweight concrete composition consists essentially of the cement, the steel slag coarse particles, the steel slag fine particles, and the iron ore coarse aggregate.

In one embodiment, 4-6 wt % of the iron ore coarse aggregate is present relative to a total weight of the heavyweight concrete composition.

In one embodiment, the cement is an ordinary Portland type I cement.

In one embodiment, the steel slag contains 20-45 wt % of iron oxide, 3-10 wt % of aluminum oxide, 15-30 wt % of calcium oxide, and 3-18 wt % of silicon dioxide, each relative to a total weight of the steel slag.

In one embodiment, the steel slag has a specific gravity of 3-4.

In one embodiment, the steel slag has a water absorption of 0.5-5%.

In one embodiment, the heavyweight concrete composition is devoid of sand.

According to a second aspect, the present disclosure relates to a wet concrete slurry including the heavyweight concrete composition of the first aspect, and 3-10 wt % of water relative to a total weight of the wet concrete slurry.

According to a third aspect, the present disclosure relates to a heavyweight concrete involving a cured form of the wet concrete slurry of the second aspect.

In one embodiment, the heavyweight concrete has a compressive strength of 60-80 MPa according to ASTM C39.

In one embodiment, the heavyweight concrete has a unit weight of 3,100-3,400 kg/m$^3$ according to ASTM C138.

In one embodiment, the heavyweight concrete has a unit weight 3-20% greater than a substantially identical concrete not formed with the iron ore coarse aggregate.

According to a fourth aspect, the present disclosure relates to a method of making the heavyweight concrete of the third aspect. The method involves casting the wet concrete slurry in a mold to form a casted wet concrete, and curing the casted wet concrete thereby forming the heavyweight concrete.

In one embodiment, casting is performed at a temperature of 15-35° C.

In one embodiment, curing takes up to 5-30 days.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
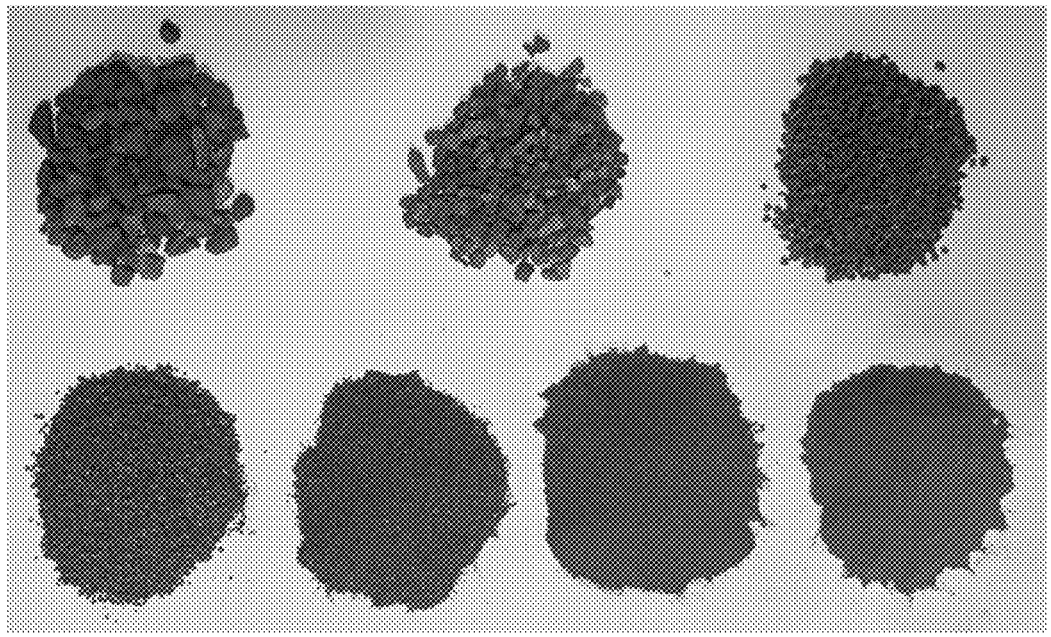
FIG. 1 is a picture illustrating steel slags having different particle sizes.

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the words "substantially similar", "approximately", or "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), ±15% of the stated value (or range of values), or ±20% of the stated value (or range of values).

According to one aspect, the present disclosure relates to a heavyweight concrete composition including (i) 8-15 wt % cement, (ii) 65-83 wt % steel slag, and (iii) 3-10 wt % of an iron ore coarse aggregate, each relative to a total weight of the heavyweight concrete composition.

Slag is the glass-like by-product left over after a desired metal has been separated (i.e., smelted) from its raw ore. Steel slag is a by-product of steel production and is made during the separation of molten steel from impurities in steel-making furnaces (e.g. electric arc furnaces, basic oxygen furnaces). Oxygen is usually injected and reacts with impurities such as carbon monoxide, silicon, manganese, phosphorus and some iron to form a liquid melt. The steel slag occurs as a mixture of the liquid melt and additional limestone and/or dolomite solidifies upon cooling. Steel slag is often disposed of as a solid waste, or sometimes used in road construction as an aggregate and in agriculture as a fertilizer.

Unlike other heavyweight concretes in which dune sand is used as fine particles, crushed steel slag of appropriate size is used herein in the form of fine particles to increase the density of the heavyweight concrete composition. Steel slag, which is an industrial byproduct available in different sizes, may be a source of both coarse and fine particles.

In one or more embodiments, the steel slag described herein comprises 20-45 wt % of iron oxide, preferably 25-40 wt %, more preferably 27-35 wt % of iron oxide relative to a total weight of the steel slag. However, the steel slag may contain iron oxide at a weight percentage smaller than 20 wt % or larger than 45 wt %. In one embodiment, the iron oxide is iron(III) oxide ($Fe_2O_3$). In another embodiment, the iron oxide is iron(II) oxide (FeO). In certain embodiments, the iron oxide includes both $Fe_2O_3$ and FeO.

The steel slag may comprise 3-10 wt % of aluminum oxide, preferably 5-10 wt %, more preferably 4-8 wt % of aluminum oxide relative to a total weight of the steel slag. However, the steel slag may contain aluminum oxide at a weight percentage smaller than 3 wt % or larger than 10 wt %. The steel slag may also comprise 15-30 wt % of calcium oxide, preferably 18-28 wt %, more preferably 20-25 wt % of calcium oxide relative to a total weight of the steel slag. However, the steel slag may contain calcium oxide at a weight percentage smaller than 15 wt % or larger than 30 wt %. The steel slag may further comprise 3-18 wt % of silicon dioxide, preferably 5-12 wt %, more preferably 7-10 wt % of silicon dioxide relative to a total weight of the steel slag. However, the steel slag may contain silicon dioxide at a weight percentage smaller than 3 wt % or larger than 18 wt %. In some embodiments, the steel slag comprises other oxides including, but not limited to, magnesium oxide, manganese oxide, and phosphorus pentoxide.

As defined herein, the term "specific gravity" refers to a ratio of the weight of a volume of a substance to the weight of an equal volume of a reference substance, e.g. water. In one or more embodiments, the steel slag used herein has a specific gravity of 2.5-4.5, preferably 3-4, more preferably 3.2-3.6, or about 3.47. In one embodiment, the steel slag has a water absorption of 0.5-5%, preferably 0.7-2.5%, more preferably 0.9-1.2%, or about 0.97%.

In one or more embodiments, the steel slag is present in the heavyweight concrete composition at an amount of 60-85 wt %, preferably 62-84 wt %, preferably 65-83 wt %, preferably 68-80 wt %, preferably 70-76 wt % by weight of the heavyweight concrete composition. However, in some embodiments, the steel slag is present in an amount of less than 60 wt % or greater than 85 wt % by weight of the heavyweight concrete composition.

A particle is defined as a small object that behaves as a whole unit with respect to its transport and properties. The steel slag used herein in any of its embodiments may be in the form of particles of the same shape or different shapes, and of the same size or different sizes. A particle size (e.g. average diameter, average particle diameter) of particles, as used herein, refers to the average linear distance measured from one point on the particle through the center of the particle to a point directly across from it for a distribution of particles. Steel slag particles may have a spherical shape, or may be shaped like cylinders, spikes, flakes, plates, ellipsoids, discs, rods, granules, cones, platelets, sheets, or some irregular shapes.

In a preferred embodiment, the steel slag is present in the heavyweight concrete composition as a mixture of steel slag coarse particles having a particle size of 1.8-12 mm, preferably 2-10 mm, more preferably 4-8 mm, and steel slag fine particles having a particle size of 0.05-1.5 mm, preferably 0.1-1.2 mm, more preferably 0.3-0.6 mm. Though in some embodiments, the steel slag coarse particles may have a particle size of greater than 12 mm, and/or the steel slag fine particles may have a particle size of less than 0.05 mm.

In one embodiment, a weight ratio of the steel slag coarse particles to the steel slag fine particles ranges from 1.5:1 to 3:1, preferably from 1.8:1 to 2.5:1, more preferably from 2.1:1 to 2.4:1. However, in some embodiments, the weight ratio of the steel slag coarse particles to the steel slag fine particles may be lower than 1.5:1 or greater than 3:1.

In one or more embodiments, the heavyweight concrete composition contains 40-60 wt %, preferably 45-55 wt %, more preferably 48-52 wt % of the steel slag coarse particles, and 18-30 wt %, preferably 20-28 wt %, more preferably 22-24 wt % of the steel slag fine particles, each relative to a total weight of the heavyweight concrete composition.

Iron ores are rocks and minerals from which metallic iron can be economically extracted. In order to increase the density of concrete, normal weight coarse aggregate may be fully replaced by iron ore because of its higher specific gravity. Iron ore is relatively expensive and is not readily available in some parts of the world.

In a preferred embodiment, the iron ore is present in the heavyweight concrete composition in the form of a coarse aggregate having a particle size of 2-10 mm, preferably 3-7 mm, more preferably 4-6 mm, or about 4.75 mm. However, in some embodiments, the iron ore coarse aggregate may have a particle size of less than 2 mm or greater than 10 mm. The iron ore coarse aggregate may be spherical or substantially spherical (e.g., oval or oblong shape). In some embodiments, the iron ore coarse aggregate is in the form of a rod, a cylinder, a platelet, a flake, a cube, a cuboid, a granule, a cone, or some irregular shape.

In one or more embodiments, the iron ore coarse aggregate is present in the heavyweight concrete composition at an amount of 2-12 wt %, preferably 3-10 wt %, more preferably 4-8 wt % by weight of the heavyweight concrete composition. However, in some embodiments, the iron ore coarse aggregate is present in an amount of less than 2 wt % or greater than 12 wt % by weight of the heavyweight concrete composition. In an alternative embodiment, the heavyweight concrete composition may be substantially free of iron ore (see Example 2, table 3), meaning that the heavyweight concrete composition may comprise less than 0.01 wt %, preferably less than 0.001 wt %, or about 0 wt % iron ore. In a preferred embodiment, 4-6 wt %, or 4.5-5.5 wt % of the iron ore coarse aggregate is present relative to a total weight of the heavyweight concrete composition.

In one embodiment, the iron ore coarse aggregate is monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the iron ore coarse aggregate is monodisperse having a particle size distribution ranging from 80% of the average particle size (e.g. diameter) to 120% of the average particle size, preferably 85-115%, preferably 90-110% of the average particle size. In another embodiment, the iron ore coarse aggregate is not monodisperse.

In one or more embodiments, a weight ratio of the aforementioned steel slag coarse particles to the iron ore coarse aggregate ranges from 4:1 to 20:1, preferably from 6:1 to 15:1, more preferably from 8:1 to 12:1. However, in some embodiments, the weight ratio of the steel slag coarse particles to the iron ore coarse aggregate may be lower than 4:1 or greater than 20:1.

In one or more embodiments, a weight ratio of the steel slag fine particles to the iron ore coarse aggregates ranges from 2:1 to 10:1, preferably from 3:1 to 8:1, more preferably from 4:1 to 6:1. However, in some embodiments, the weight ratio of the steel slag fine particles to the iron ore coarse aggregate may be lower than 2:1 or greater than 10:1.

In some embodiments, the heavyweight concrete composition described herein may comprise substantially no sand, for instance, less than 0.1 wt % of sand, preferably less than 0.05 wt % of sand, more preferably less than 0.01 wt % of sand, relative to a total weight of the heavyweight concrete composition. In at least one embodiment, the heavyweight concrete composition described herein is devoid of sand.

As used herein, the term "cement" refers to a composition or substance with one or more constituents that are capable of binding other materials together once cured. Generally, cement may include a number of dry constituents chosen based on the desired ratio or class of cement to be produced. Thus, cement refers to a dry composition before curing unless the context clearly dictates otherwise, for example, in a wet cement slurry, or in a cured cement material. In one embodiment, the cement used herein may include hydraulic cement, non-hydraulic cement, or a combination thereof. In a preferred embodiment, the cement comprises Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard).

Additional cement types include hydraulic cements, Saudi Class G hydraulic cement, non-hydraulic cements, Portland fly ash cement, Portland Pozzolan cement, Portland silica fume cement, masonry cements, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar. In some embodiments, silica ($SiO_2$) may be present in the cement. Alternatively, the cement may include $SiO_2$-containing materials including, but not limited to, belite ($2CaO.SiO_2$), alite ($3CaO.SiO_2$), celite ($3CaO.Al_2O_3$), or brownmillerite ($4CaO.Al_2O_3.Fe_2O_3$).

In one embodiment, the cement comprises a cement blend of two or more types of cement, for example, a blend comprising Portland cement and non-Portland hydraulic cement. In a further embodiment, the cement is in the dry form. If needed to set, water is typically added after the cement is mixed with the other components or ingredients, for example, the steel slag coarse and fine particles, and the iron ore coarse aggregate, and it is then ready to be hardened or set.

As used herein, the term "hydraulic cement" refers to any inorganic cement that hardens, cures or sets due to hydration. Exemplary hydraulic cements include Portland cements, aluminous cements, Pozzolan cements, fly ash cements, and the like. Hydraulic cements set and develop compressive strength due to the occurrence of a hydration reaction which allows them to set or cure under the presence of water. The physical properties of the set cement relate to the crystalline structure of the calcium-silicate-hydrates formed during hydration reaction. For example, conventional Portland cements form an interlocking crystalline network of, e.g. tricalcium silicate, dicalcium silicate, tetracalcium aluminum ferrite and calcium hydroxide crystals. These crystals interconnect to form an interlocking crystalline structure which provides flexural strength and a degree of resiliency. Hydration products of Portland cements may also form crystalline or amorphous interlocking networks of the hydration products such as calcium silicate hydrate, calcium hydroxide (Portlandite), calcium silicate (Larnite), aluminum calcium iron oxide (e.g. $Ca_2FeAlO_5$), and/or silica.

The term "hydraulically-active" refers to properties of a cement material that allow the material to set in a manner like hydraulic cement, either with or without additional activation. Hydraulically-active cement materials may also have minor amounts of extenders such as bentonite, gilsonite, strength enhancers such as silica powder or silica flour.

In one or more embodiments, the cement is present in the heavyweight concrete composition at an amount of 8-15 wt %, preferably 9-14 wt %, more preferably 10-13 wt % by weight of the heavyweight concrete composition. However, in some embodiments, the cement is present in an amount of less than 8 wt % or greater than 15 wt % by weight of the heavyweight concrete composition. In a preferred embodiment, the cement is an ordinary Portland type I cement.

In one or more embodiments, the heavyweight concrete composition consists essentially of the cement, the steel slag coarse particles, the steel slag fine particles, and the iron ore coarse aggregate. In at least one embodiment, the heavyweight concrete composition consists essentially of (i) 8-15 wt %, 9-14 wt %, or 10-13 wt % of the cement, (ii) 40-60 wt %, 45-55 wt %, or 48-52 wt % of the steel slag coarse particles, (iii) 18-30 wt %, 20-28 wt %, or 22-24 wt % of the steel slag fine particles, and (iv) 2-12 wt %, 3-10 wt %, or 4-8 wt % of the iron ore coarse aggregate, each relative to a total weight of the heavyweight concrete composition.

According to another aspect, the present disclosure relates to a wet concrete slurry including water and the heavyweight concrete composition disclosed herein in any of its embodiments.

In one or more embodiments, water may be present in the wet concrete slurry in an amount of 2-10 wt % by weight of the wet concrete slurry, preferably 3-8 wt %, more preferably 4-6 wt % by weight of the wet concrete slurry. In general, the amount of water used in the wet concrete slurry depends upon the type of hydraulic cement selected and the job conditions at hand. Thus, in other embodiments, the water may be present in the wet concrete slurry in an amount of less than 2 wt % or greater than 10 wt % by weight of the wet concrete slurry. The amount of water used may vary over a wide range, depending upon factors such as the chemical identity of the cement and the required consistency of the wet concrete slurry.

The water may be freshwater or seawater, and may be taken from a natural source, such as an aquifer, lake, or ocean, and may be filtered to remove large solids before using. A brine, which is an aqueous mixture of one or more soluble salts (e.g. sodium chloride, potassium chloride, calcium chloride, calcium bromide, sodium bromide, potassium bromide, zinc bromide), may be used as water. Seawater or water from a salt lake may be considered a brine.

In one embodiment, the wet concrete slurry comprises at least one additive selected from the group consisting of a superplasticizer, an accelerator, a retarder, a pigment, a bonding agent, a pumping aid, and a viscosifying agent. The amount of additive typically is dependent on the type of hydraulic cement used and desired density of the wet concrete slurry. One or more additives may be present in the cement at a weight percentage of 0.1-2.0 wt %, preferably 0.2-1.5 wt %, more preferably 0.5-1.0 wt % by weight of the cement. However, in some embodiments, less than 0.1 wt % or greater than 2.0 wt % of cement additive by weight of the cement may be present.

As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers a chemical admixture used herein to provide a well-dispersed particle suspension in the wet concrete slurry. The superplasticizer may be used to prevent particle segregation and to improve the flow characteristics of the wet concrete slurry. The superplasticizer may be a polycarboxylate, e.g. a polycarboxylate derivative with polyethylene oxide side chains, a polycarboxylate ether (PCE) superplasticizer, such as the commercially available Glenium 51®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain) grafted with methacrylic acid copolymer (main chain). Exemplary superplasticizers that may be used in addition to, or in lieu of a polycarboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof.

As used herein, accelerators refer to chemical admixtures that speed up the hydration (hardening) of a concrete and may be useful for modifying the properties of concrete in cold weather. Exemplary accelerators include, but are not limited to, $CaCl_2$, $Ca(NO_3)_2$, and $NaNO_3$. As used herein, retarders, e.g. polyol retarders, refer to chemical admixtures that slow the hydration of a cement and may be used in large-scale pours where partial hardening may be unavoidable without the presence of a retarder. Exemplary retarders include, without limitation, sugar, sucrose, sodium gluconate, glucose, citric acid, tartaric acid and the like. Pigments may be used to change the color of the concrete for aesthetic appeal. Bonding agents (typically a polymer) may be used to create a bond between old and new concrete with wide temperature tolerance and corrosion resistance. Pumping aids may be used to improve pumpability, thicken the wet concrete slurry and reduce separation and bleeding.

In certain embodiments, a viscosifying agent may be added to modify rheological properties of the wet concrete slurry. Exemplary viscosifying agents include, without limitation, cellulose ethers, polysaccharides, hydroxyalkylcelluloses, hydroxyethylcelluloses, methylcellulose, carboxymethylcellulose, hydroxyethylcellulose or ethylhydroxyethylcellulose, polyethylene oxides, polyvinyl alcohols, polyamides and the like or mixtures thereof.

According to another aspect, the present disclosure relates to a heavyweight concrete involving a cured form of the wet concrete slurry disclosed herein in any of its embodiments.

The heavyweight concrete may be made by sequentially pouring different components into a concrete mixer (e.g. a paddle mixer, a drum mixer, a rotating mixer). For example, the aforementioned heavyweight concrete composition including the cement, the steel slag coarse particles, the steel slag fine particles, and the iron ore coarse aggregate are dry-mixed in a concrete paddle mixer for a time period ranging from 30 seconds-30 minutes, 60 seconds-20 minutes, or 5-10 minutes. Preferably, mixing the cement, the steel slag coarse particles, the steel slag fine particles, and the iron ore coarse aggregate forms a homogeneous dry mixture.

Following the dry mixing process, water is added to the dry mixture to form a wet concrete slurry. The water is slowly poured into the concrete mixer while the concrete mixer turns the dry mixture for a time period ranging from 1-10 minutes, 2-8 minutes, or 3-6 minutes thereby forming a wet concrete mixture. Preferably, the water is mixed into the dry mixture for a time period of about 3 minutes. After a thorough mixing, optional superplasticizer, viscosifying agent and other additives may be slowly poured into the concrete mixer, and the wet concrete mixture is further mixed for a time period of 1-10 minutes, 2-8 minutes, or 3-6 minutes thereby forming the wet concrete slurry.

The wet concrete slurry containing the cement, the steel slag coarse particles, the steel slag fine particles, and the iron ore coarse aggregate, water, optional superplasticizer, viscosifying agent and other additives may be then cast into a mold at a temperature of 10-40° C., preferably 15-35° C., more preferably 23-27° C. thereby forming a casted wet concrete. The wet concrete slurry may be compacted in the mold by using a steel rod or a trowel. In one embodiment, the cast wet concrete may be cured for a time period of 2-48 hours, 6-36 hours, or 12-24 hours and then removed from the mold, which results in a heavyweight concrete.

The heavyweight concrete may be left to further cure for a length of time necessary to achieve a desired mechanical property, such as a desired compressive strength. Preferably the heavyweight concrete, left to cure, will harden with a mechanical strength (e.g. compressive or tensile strength) that increases over the curing time. However, a strength will reach a maximum value within a certain time of curing, for example, within 28 days. In one embodiment, the heavyweight concrete may be left to further cure for a time period of 1-30 days, preferably 5-28 days, more preferably 14-21 days, though in certain embodiments, the heavyweight concrete may be considered cured in less than 1 day or after 30 days. The heavyweight concrete may be further cured at a temperature of 10-40° C., 15-35° C. or 20-28° C. Methods of preparing and curing wet concrete slurries are generally known to those skilled in the art.

As defined herein, compressive strength is the capacity of a material or structure to withstand compressive loads, as opposed to tensile strength, which is the capacity of a material or structure to withstand tensile loads. In one or more embodiments, the heavyweight concrete described herein has a 7 days cube compressive strength of 60-90 MPa, preferably 62-80 MPa, preferably 65-78 MPa, preferably 68-75 MPa, preferably 70-72 MPa. In one embodiment, the compressive strength of the heavyweight concrete is determined by ASTM C39. In at least one embodiment, the compressive strength is determined after further curing the heavyweight concrete for 5-9 days, 6-8 days, or 7 days.

As used herein, a unit weight (also known as "specific weight") is the weight per unit volume of a material. In one or more embodiments, the heavyweight concrete described herein has a unit weight of 3,000-3,500 $kg/m^3$, preferably 3,100-3,400 $kg/m^3$, preferably 3,150-3,300 $kg/m^3$, preferably 3180-3280 $kg/m^3$, preferably 3200-3250 $kg/m^3$. However, in certain embodiments, the heavyweight concrete may have a unit weight smaller than 3000 $kg/m^3$, or greater than 3500 $kg/m^3$. 1 pcf ($lb/ft^3$) is equal to about 16.018 $kg/m^3$. Alternatively, the heavyweight concrete has a unit weight of 190-220 pcf, preferably 195-215 pcf, preferably 198-210 pcf, preferably 200-208 pcf, preferably 204-206 pcf, though in some embodiments the heavyweight concrete may have a unit weight smaller than 190 pcf, or greater than 220 pcf. In one embodiment, the unit weight of the heavyweight concrete is determined by ASTM C138.

The presence of the iron ore coarse aggregate in the wet concrete slurry makes the heavyweight concrete reach a greater unit weight than a concrete that is not formed with iron ore (see Example 6 by comparing Tables 5 and 6). For instance, in one embodiment, the heavyweight concrete may have a unit weight 3-20% greater, preferably 5-15% greater, more preferably 8-12% greater than a substantially identical concrete not formed with the iron ore coarse aggregate. Here, the substantially identical concrete not formed with the iron ore coarse aggregate may refer to a concrete cured by a wet concrete mixture comprising cement, the steel slag coarse particles, the steel slag fine particles, and water, each present in relative weight percentages substantially similar to those in the aforementioned wet concrete slurry. In one embodiment, the essentially identical concrete not formed with iron ore may have a unit weight of 2600-3114 $kg/m^3$, 2700-2900 $kg/m^3$, or 2750-2800 $kg/m^3$ (see Table 5).

The heavyweight concrete described herein has dual benefit of serving as an economical heavyweight concrete coating and promoting an effective utilization of industrial byproducts (e.g. steel slag). The heavyweight concrete may have a principle application as a submarine pipeline coating. In addition, the heavyweight concrete may be used in other fields including gravity-based structures, ballasting for floating wind constructions, coastal and erosion protection, anchors for wave and tidal devices, and radiation shielding applications.

A subsea pipeline (also known as submarine pipeline) is a pipeline that is laid on the seabed or below it inside a trench. Pipeline construction generally involves assembling a number of subsea pipes into a full line, and installing that line along a desired route. A subsea pipe (or submarine pipe) can be any type of pipe intended to be used while submerged in a body of water (e.g. sea water, fresh water). For example, a subsea pipe may have an outer diameter ranging from 3-100 inches, 10-75 inches, or 15-50 inches.

The heavyweight concrete described herein in any of its embodiments may be used as a coating on a subsea pipe of any size. The heavyweight concrete adheres or otherwise is attached to an exterior surface of a pipe. The heavyweight concrete may be attached to a pipe by, for example spraying, pouring, or compressing it onto the pipe. Preferably, the heavyweight concrete extends circumferentially around an exterior surface and extends axially to cover a substantial length of the pipe. The thickness of the heavyweight concrete may range from about 1 inch to about 6 inches, 2 inches to 5 inches, or about 3 inches to 4 inches.

Subsea pipes coated with the heavyweight concrete may be used in a variety of ways. For example, they can be joined together and placed on the floor of the sea to form a subsea pipeline. The high density of the heavyweight concrete can provide enough negative buoyancy to reduce or eliminate the subsea pipeline's tendency to float towards the surface.

The examples below are intended to further illustrate protocols for preparing, characterizing the heavyweight concrete, and uses thereof, and are not intended to limit the scope of the claims.

Example 1

Materials
(i) Coarse and Fine Aggregates
Coarse and fine aggregates utilized in the study were crushed steel slag from the steel manufacturing industry (HADEED). Steel slag was a byproduct generated during iron and steel manufacturing process from the electric arc furnace. After air cooling, it solidified and became a hard rock like substance. Subsequently, it was mechanically broken into pieces. During the process of mechanical crushing various sizes of steel slag were generated. The sizes ranged from very large particles to fine powders. For this study, appropriate sizes of coarse and fine slag aggregate were selected from the size ranges generated during mechanical crushing.

The bulk specific gravity and water absorption of steel slag aggregate acquired from the local supplier was 3.47 gr/cc and 0.97%, respectively.

(ii) Cementitious Materials
Ordinary Portland Type I cement at an amount of 400 kg/m³ was used in all the mix concrete compositions prepared in the study.

Example 2

Mix Design Parameters of the Concrete Composition
The studies were conducted by varying different parameters in the concrete composition which influence unit weight and strength of the concrete. Mix design parameters were initially acquired by varying coarse and fine particles gradation and their individual quantities without introducing iron ore. Subsequently, mix design parameters were finalized by determining the needed quantity of iron ore in the concrete composition to meet minimum density and strength requirements.

Coarse and fine aggregate gradation used for the preparation of concrete compositions was selected in accordance with the ASTM C33 [ASTM C33 (2005). Standard specifications for concrete aggregates, Annual Book of ASTM Standards, v. 4.02, American Society for Testing and Materials, West Conshohocken, Pa., incorporated herein by reference in its entirety]. Table 1 summarizes percentage ranges of passing through each sieve according to size number 8 for coarse aggregate. Table 2 gives the percentage ranges passing according to ASTM C33 for fine aggregate.

FIG. 1 shows aggregates of different sizes used in the concrete composition. Different concrete compositions were prepared by varying (i) coarse aggregate to total aggregate ratio (CA/TA), (ii) fine aggregate to total aggregate ratio (FA/TA), and (iii) percentages of aggregates retained on each sieve as proposed in ASTM C33. Table 3 shows constituent materials for each concrete composition without iron ore prepared in the study. Table 4 shows constituent materials of each concrete composition with iron ore prepared by partially replacing steel slag particles with iron ore.

TABLE 1

Coarse aggregate gradation according to ASTM C33-05
Coarse Aggregates as per ASTM C 33-05 (Size no. 8)

| Size | 12.5 mm | 9.50 mm | 4.75 mm | 2.36 mm | 1.18 mm |
|---|---|---|---|---|---|
| Passing range, % | 100 | 85 to 100 | 10 to 30 | 0 to 10 | 0 to 5 |
| Retained range, % | 0 | 0 to 15 | 70 to 90 | 10 to 30 | 0 to 10 |

TABLE 2

Fine aggregate gradation according to ASTM C33-05
Fine Aggregates as per ASTM C 33-05

| Size | 2.36 mm | 1.18 mm | 600 µm | 300 µm | 150 µm |
|---|---|---|---|---|---|
| Passing range, % | 80 to 100 | 50 to 85 | 25 to 60 | 5 to 30 | 0 to 10 |
| Retained range, % | 0 | 15-50 | 25-60 | 20-50 | 5-30 |

TABLE 3

Constituent materials used to prepare concrete compositions without iron ore

| | Cement | | | | Coarse Aggregate | | | Fine Aggregate | | |
|---|---|---|---|---|---|---|---|---|---|---|
| Mix# | content, kg/m³ | CA/TA ratio | FA/TA ratio | Water kg/m³ | Size, mm | % Retained | Quantity, kg/m³ | Size, mm | % Retained | Quantity, kg/m³ |
| M1 | 400 | 0.55 | 0.45 | 165.5 | 9.5 | 0 | 0.00 | As received fine aggregate used without sieving | | 1186.30 |
| | | | | | 4.75 | 70 | 1014.98 | | | |
| | | | | | 2.36 | 30 | 434.99 | | | |
| | | | | | 1.18 | 0 | 0.00 | | | |

TABLE 3-continued

Constituent materials used to prepare concrete compositions without iron ore

| | Cement | | | | Coarse Aggregate | | | Fine Aggregate | | |
|---|---|---|---|---|---|---|---|---|---|---|
| Mix# | content, kg/m³ | CA/TA, ratio | FA/TA, ratio | Water kg/m³ | Size, mm | % Retained | Quantity, kg/m³ | Size, mm | % Retained | Quantity, kg/m³ |
| M2 | 400 | 0.55 | 0.45 | 165.5 | 9.5 | 10 | 145.00 | As is fine aggregate used without sieving | | 1186.30 |
| | | | | | 4.75 | 60 | 869.99 | | | |
| | | | | | 2.36 | 30 | 434.99 | | | |
| | | | | | 1.18 | 0 | 0.00 | | | |
| M3 | 450 | 0.55 | 0.45 | 181.98 | 9.5 | 0 | 0.00 | As is fine aggregate used without sieving | | 1139.40 |
| | | | | | 4.75 | 70 | 974.86 | | | |
| | | | | | 2.36 | 30 | 417.80 | | | |
| | | | | | 1.18 | 0 | 0.00 | | | |
| M4 | 450 | 0.55 | 0.45 | 181.98 | 9.5 | 10 | 139.27 | As is fine aggregate used without sieving | | 1139.40 |
| | | | | | 4.75 | 70 | 835.60 | | | |
| | | | | | 2.36 | 30 | 417.80 | | | |
| | | | | | 1.18 | 0 | 0.00 | | | |
| M5 | 400 | 0.55 | 0.45 | 165.5 | 9.5 | 0 | 0.00 | 1.18 | 40 | 474.54 |
| | | | | | 4.75 | 70 | 1014.98 | 0.6 | 35 | 415.22 |
| | | | | | 2.36 | 30 | 434.99 | 0.3 | 15 | 177.95 |
| | | | | | 1.18 | 0 | 0.00 | 0.15 | 10 | 118.63 |
| M6 | 400 | 0.55 | 0.45 | 165.5 | 9.5 | 10 | 145.00 | 1.18 | 40 | 474.54 |
| | | | | | 4.75 | 60 | 869.99 | 0.6 | 35 | 415.22 |
| | | | | | 2.36 | 30 | 434.99 | 0.3 | 15 | 177.95 |
| | | | | | 1.18 | 0 | 0.00 | 0.15 | 10 | 118.63 |
| M7 | 400 | 0.55 | 0.45 | 165.5 | 9.5 | 0 | 0.00 | 1.18 | 30 | 355.90 |
| | | | | | 4.75 | 70 | 1014.98 | 0.6 | 30 | 355.90 |
| | | | | | 2.36 | 30 | 434.99 | 0.3 | 25 | 296.59 |
| | | | | | 1.18 | 0 | 0.00 | 0.15 | 15 | 177.95 |
| M8 | 400 | 0.55 | 0.45 | 165.5 | 9.5 | 0 | 0.00 | 1.18 | 25 | 296.59 |
| | | | | | 4.75 | 70 | 1014.98 | 0.6 | 25 | 296.59 |
| | | | | | 2.36 | 30 | 434.99 | 0.3 | 30 | 355.90 |
| | | | | | 1.18 | 0 | 0.00 | 0.15 | 20 | 237.27 |
| M9 | 400 | 0.55 | 0.45 | 165.5 | 9.5 | 0 | 0.00 | 1.18 | 20 | 237.27 |
| | | | | | 4.75 | 70 | 1014.98 | 0.6 | 20 | 237.27 |
| | | | | | 2.36 | 30 | 434.99 | 0.3 | 35 | 415.22 |
| | | | | | 1.18 | 0 | 0.00 | 0.15 | 25 | 296.59 |
| M10 | 400 | 0.6 | 0.4 | 165.5 | 9.5 | 0 | 0.00 | 1.18 | 30 | 316.36 |
| | | | | | 4.75 | 70 | 1107.25 | 0.6 | 30 | 316.36 |
| | | | | | 2.36 | 30 | 474.54 | 0.3 | 25 | 263.63 |
| | | | | | 1.18 | 0 | 0.00 | 0.15 | 15 | 158.18 |
| M11 | 400 | 0.65 | 0.35 | 165.5 | 9.5 | 0 | 0.00 | 1.18 | 30 | 276.81 |
| | | | | | 4.75 | 70 | 1199.53 | 0.6 | 30 | 276.81 |
| | | | | | 2.36 | 30 | 514.08 | 0.3 | 25 | 230.68 |
| | | | | | 1.18 | 0 | 0.00 | 0.15 | 15 | 138.41 |

TABLE 4

Constituent materials used to prepare concrete compositions incorporating iron ore
(the heavyweight concrete compositions)

| | Cement | | | | | Iron Ore Coarse Agg | Coarse Aggregate | | | Fine Aggregate | | |
|---|---|---|---|---|---|---|---|---|---|---|---|---|
| Mix# | content, kg/m³ | CA/TA, ratio | FA/TA, ratio | IO/TA, ratio | Water kg/m³ | (4.75 mm), kg/m³ | Size, mm | % Retained | Quantity, kg/m³ | Size, mm | % Retained | Quantity, kg/m³ |
| M12 | 400 | 0.65 | 0.30 | 0.05 | 152.7 | 131.10 | 9.5 | 15 | 255.55 | 1.18 | 30 | 235.9 |
| | | | | | | | 4.75 | 55 | 937.05 | 0.6 | 30 | 239.9 |
| | | | | | | | 2.36 | 30 | 511.11 | 0.3 | 25 | 196.58 |
| | | | | | | | 1.18 | 0 | 0.00 | 0.15 | 15 | 117.95 |
| M13 | 400 | 0.62 | 0.30 | 0.08 | 152.65 | 211.45 | 9.5 | 15 | 245.81 | 1.18 | 25 | 237.88 |
| | | | | | | | 4.75 | 55 | 901.31 | 0.6 | 25 | 237.88 |
| | | | | | | | 2.36 | 30 | 491.62 | 0.3 | 30 | 198.23 |
| | | | | | | | 1.18 | 0 | 0.00 | 0.15 | 20 | 118.94 |
| M14 | 400 | 0.60 | 0.30 | 0.10 | 152.58 | 265.81 | 9.5 | 15 | 239.22 | 1.18 | 25 | 239.22 |
| | | | | | | | 4.75 | 55 | 877.15 | 0.6 | 25 | 239.22 |
| | | | | | | | 2.36 | 30 | 478.44 | 0.3 | 30 | 199.35 |
| | | | | | | | 1.18 | 0 | 0.00 | 0.15 | 20 | 119.61 |

Example 3

Concrete Mixing and Sample Preparation

Figure 2:
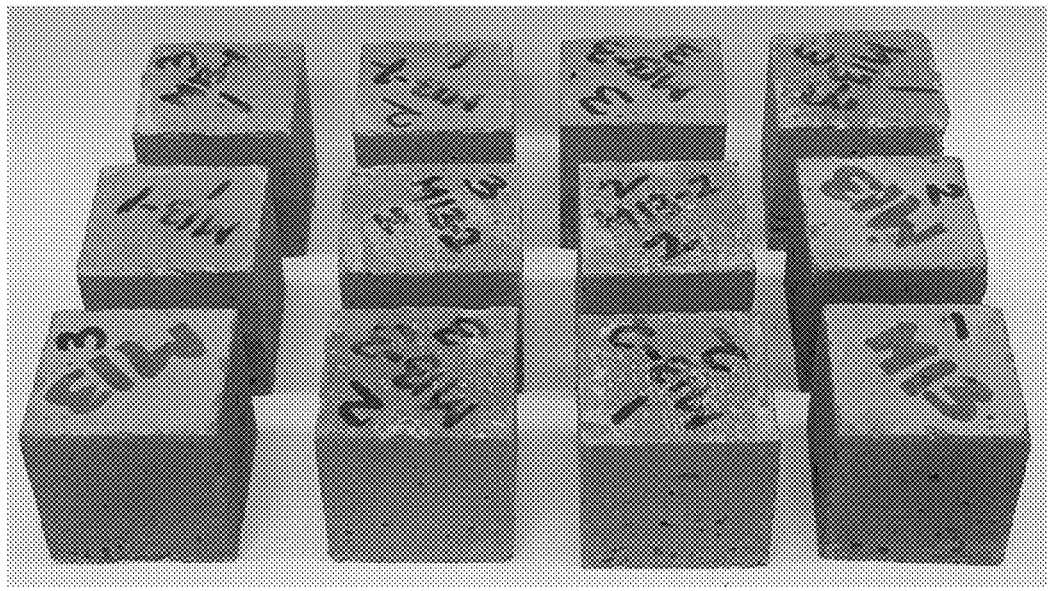
FIG. 2 is a picture illustrating heavyweight concrete blocks prepared from wet concrete slurry containing steel slag.

Required quantities of coarse and fine aggregates along with the cementitious materials were measured and placed in a paddle mixer and thoroughly mixed prior to the addition of water. Wet mixing continued for at least three minutes to ensure the homogeneity of the wet mixture. Subsequently, the wet concrete was poured into molds of various sizes and shapes for different tests. The surface of the wet concrete in a mold was carefully smoothened with a trowel to get a smooth finish. After the placement, consolidation, and finishing of concrete, the specimens were covered with a plastic sheet to prevent moisture loss, and were kept in the laboratory at 25±2° C. for 24 hours before being de-molded. Immediately after demolding, weight and dimensions of each sample were recorded to determine the unit weight of the concrete. FIG. 2 shows concrete specimens prepared with steel slag.

Example 4

Curing

After 24 hours of casting, the concrete specimens were de-molded and cured under wet burlap for 28 days.

Example 5

Evaluation Methods

The concrete specimens prepared with different concrete compositions were evaluated to determine following properties according to standard procedures at appropriate curing periods:

(i) Unit weight of the concrete was measured on 50 mm cube specimens after one day of casting, according to ASTM C138 [ASTM C138 (2005). Standard Test Method for Density (Unit Weight), Yield, and Air Content (Gravimetric) of Concrete, Annual Book of ASTM Standards, v. 4.02, American Society for Testing and Materials, West Conshohocken, Pa., incorporated herein by reference in its entirety]; and (ii) Compressive strength of concrete was measured on 50 mm cube specimens at 7 and 28 days of curing, according to ASTM C39 [ASTM C 39 (2005). Standard test method for compressive strength of cylindrical concrete specimens, Annual Book of ASTM Standards, v. 4.02, American Society for Testing and Materials, West Conshohocken, Pa., incorporated herein by reference in its entirety].

Example 6

Unit Weight

Table 5 summarizes unit weights of all the concretes prepared without iron ore. Although a required unit weight is about 190 pcf for heavyweight concrete, the target was set to 200 pcf to account for any margins of error. Unit weight of the concrete was measured after 1 day of casting.

Unit weights of concrete prepared from concrete compositions M1 to M4 were less than 180 pcf, which might be resulted from using fine slag aggregate as received without appropriate gradation according to ASTM C33. Subsequently, steel slag aggregate was sieved and separated into various sizes. Concrete compositions M5 to M9 were prepared by using a CA/TA (coarse aggregate/total aggregate) and FA/TA (fine aggregate/total aggregate) ratio of 0.55 and 0.45, respectively. Percentages of different coarse and fine aggregates selected in accordance with ASTM C33 were varied in these compositions while keeping the ratios of CA/TA and FA/TA constant. The unit weights of concretes prepared by concrete compositions M5 to M9 were in the range of 183 to 192 pcf. After determining the proper percentages of coarse and fine aggregates, concrete compositions M10 with a CA/TA ratio of 0.6 and a FA/TA ratio of 0.4, and M11 with a CA/TA ratio of 0.65 and a FA/TA ratio of 0.35 were prepared. Concrete composition M11 led to a concrete with a unit weight of 194.28 pcf.

TABLE 5

Unit weight of concretes produced by various concrete mixes without iron ore

| Mix # | Sample # | Weight, gr | Length, mm | Width, mm | Depth, mm | Unit Weight, $kg/m^3$ | Avg. Unit Weight, $kg/m^3$ | Avg. Unit Weight, pcf | Remarks |
|---|---|---|---|---|---|---|---|---|---|
| M1 | Sample 1 | 397.1 | 50.25 | 51.56 | 52.45 | 2922.17 | 2905.36 | 181.29 | Unit |
|  | Sample 2 | 395.3 | 50.29 | 51.25 | 52.78 | 2905.91 |  |  | weight < |
|  | Sample 3 | 400.6 | 51.67 | 51.33 | 52.3 | 2888.02 |  |  | 190 pcf |
| M2 | Sample 1 | 398.2 | 50.35 | 50.89 | 53.09 | 2927.23 | 2858.50 | 178.37 | Unit |
|  | Sample 2 | 394.1 | 51.23 | 52.09 | 50.88 | 2902.56 |  |  | weight < |
|  | Sample 3 | 391.8 | 51.35 | 52.78 | 52.65 | 2745.72 |  |  | 190 pcf |
| M3 | Sample 1 | 392.9 | 51.25 | 52.33 | 52 | 2817.31 | 2827.86 | 176.45 | Unit |
|  | Sample 2 | 386.3 | 51.26 | 52.44 | 52.01 | 2763.10 |  |  | weight < |
|  | Sample 3 | 390.1 | 51.55 | 51.22 | 50.89 | 2903.19 |  |  | 190 pcf |
| M4 | Sample 1 | 384.3 | 51.65 | 51.89 | 52.23 | 2745.34 | 2752.44 | 171.75 | Unit |
|  | Sample 2 | 376.1 | 51.89 | 52.09 | 52.13 | 2669.18 |  |  | weight < |
|  | Sample 3 | 389.1 | 51.27 | 52.07 | 51.27 | 2842.80 |  |  | 190 pcf |
| M5 | Sample 1 | 415.44 | 51.65 | 52.13 | 52.76 | 2924.46 | 2970.22 | 185.34 | Unit |
|  | Sample 2 | 413.2 | 51.56 | 51.22 | 52.54 | 2977.95 |  |  | weight < |
|  | Sample 3 | 407.57 | 50.76 | 51.25 | 52.08 | 3008.26 |  |  | 190 pcf |
| M6 | Sample 1 | 405.25 | 51.24 | 51.67 | 51.06 | 2997.74 | 2975.32 | 185.65 | Unit |
|  | Sample 2 | 401.77 | 51.76 | 51.78 | 50.09 | 2992.75 |  |  | weight < |
|  | Sample 3 | 397.12 | 51.55 | 52.34 | 50.14 | 2935.45 |  |  | 190 pcf |
| M7 | Sample 1 | 412.7 | 50.01 | 51.83 | 51.42 | 3096.45 | 3087.10 | 192.64 | Unit |
|  | Sample 2 | 415.21 | 50.44 | 51.94 | 51.35 | 3086.39 |  |  | weight > |
|  | Sample 3 | 417.25 | 51.96 | 50.27 | 51.89 | 3078.47 |  |  | 190 pcf |
| M8 | Sample 1 | 409 | 51.25 | 50.55 | 52.13 | 3028.45 | 3026.11 | 188.83 | Unit |
|  | Sample 2 | 408.7 | 50.54 | 51.26 | 52.17 | 3023.92 |  |  | weight < |
|  | Sample 3 | 410.6 | 50.67 | 51.45 | 52.05 | 3025.95 |  |  | 190 pcf |

TABLE 5-continued

Unit weight of concretes produced by various concrete mixes without iron ore

| Mix # | Sample # | Weight, gr | Length, mm | Width, mm | Depth, mm | Unit Weight, kg/m³ | Avg. Unit Weight, kg/m³ | Avg. Unit Weight, pcf | Remarks |
|---|---|---|---|---|---|---|---|---|---|
| M9 | Sample 1 | 396.3 | 51.26 | 51.25 | 50.78 | 2970.70 | 2947.08 | 183.90 | Unit weight < 190 pcf |
|  | Sample 2 | 399.9 | 50.77 | 51.33 | 52.05 | 2948.17 |  |  |  |
|  | Sample 3 | 401.1 | 50.76 | 51.23 | 52.78 | 2922.38 |  |  |  |
| M10 | Sample 1 | 409.2 | 50.45 | 50.11 | 52.55 | 3080.19 | 3111.58 | 194.16 | Unit weight > 190 pcf |
|  | Sample 2 | 414.5 | 50.42 | 50 | 51.97 | 3163.73 |  |  |  |
|  | Sample 3 | 409.3 | 50.14 | 50.47 | 52.33 | 3090.82 |  |  |  |
| M11 | Sample 1 | 423.6 | 50.29 | 52.18 | 51.53 | 3132.64 | 3113.43 | 194.28 | Unit weight > 190 pcf |
|  | Sample 2 | 432 | 52.68 | 50.4 | 51.22 | 3176.64 |  |  |  |
|  | Sample 3 | 424.1 | 53.5 | 50.45 | 51.84 | 3031.02 |  |  |  |

Keeping the mix design parameters of concrete composition M11 as a reference, subsequent studies were conducted by incorporating iron ore in order to further increase the unit weight of concrete.

Concrete compositions M12, M13 and M14 were prepared by incorporating 4.13%, 6.62%, and 8.28% of iron ore, respectively. The unit weight of concretes prepared by concrete compositions M12, M13 and M14 is 198.78, 200.06, and 204.74 pcf, respectively, as given in Table 6. Therefore, concrete compositions M13 and M14 with a concrete density higher than 200 pcf are qualified to be used as heavyweight concrete coating. Concrete composition M14 is recommended as concrete heavyweight coating for submarine pipelines because of its marginally higher density.

TABLE 6

Unit weight of heavyweight concrete produced by concrete compositions incorporating iron ore

| Mix # | Sample # | Weight, gr | Length, mm | Width, mm | Depth, mm | Unit Weight, kg/m³ | Avg. Unit Weight, kg/m³ | Avg. Unit Weight, pcf | Remarks |
|---|---|---|---|---|---|---|---|---|---|
| M12 | Sample 1 | 414.4 | 50.01 | 50.17 | 51.97 | 3178.09 | 3185.52 | 198.78 | Unit weight < 190 pcf |
|  | Sample 2 | 416.9 | 50.09 | 50.63 | 51.45 | 3195.12 |  |  |  |
|  | Sample 3 | 421.2 | 50.08 | 50.21 | 52.62 | 3183.34 |  |  |  |
| M13 | Sample 1 | 425.9 | 50.33 | 51.32 | 51.33 | 3212.35 | 3206.08 | 200.06 | Unit weight = 200 pcf |
|  | Sample 2 | 425.2 | 51.29 | 50.2 | 51.56 | 3202.90 |  |  |  |
|  | Sample 3 | 419.7 | 49.84 | 51.46 | 51.09 | 3202.99 |  |  |  |
| M14 | Sample 1 | 435.8 | 50.29 | 50.45 | 52.53 | 3269.92 | 3281.02 | 204.74 | Unit weight > 200 pcf |
|  | Sample 2 | 426.5 | 50.33 | 50.4 | 51.22 | 3282.63 |  |  |  |
|  | Sample 3 | 437.6 | 50.42 | 50.88 | 51.84 | 3290.50 |  |  |  |

A remarkable advantage of the current heavyweight concrete composition is that it is developed by replacing a major proportion of iron with steel slag, which is a cheap and abundantly available industrial byproduct. Steel slag used in the heavyweight concrete composition is about 75%, while iron ore used is only about 6% to 8% of. The developed heavyweight concrete composition has a sufficient unit weight allowing it to be used as concrete heavyweight coating for submarine pipelines. Therefore, utilizing the disclosed heavyweight concrete composition as coating for submarine pipelines will have dual benefit of significantly reducing the cost of coating the pipes and promoting an effective utilization of industrial byproducts and conservation of land needed for storing them.

Example 7

Compressive Strength

An average compressive strength of concretes at 7 days of curing prepared by concrete compositions M13 and M14 is 62.5 MPa and 74.5 MPa, respectively, which is more than sufficient to qualify these concretes as heavyweight coating for the submarine pipelines. 28-day compressive strength of M13 and M14 is 65.9 MPa and 77.8 MPa, respectively. The required compressive strength of heavyweight concrete coating is 28 MPa.

Example 8

Cost Analysis

Table 7 compares costs of producing 1 m³ of different concrete compositions. The cost of producing 1 m³ of concrete with 100% iron ore, which is currently used in the pipe coating industry, and partially replacing iron as developed by Al Mehthel et. al, [Al-Mehthel M., Maslehuddin M., Hammad B., Al-Sharif Alaeddin A., Ibrahim M, (2014), Economical Heavy Concrete Weight Coating for Submarine Pipelines, U.S. Pat. No. 8,662,111, incorporated herein by reference in its entirety] is SAR 1166 (US$310) and SAR 708 (US$ 190), respectively. The cost of materials for the disclosed concrete compositions M13 and M14 is SAR 226 (US$60) and SAR 245 (US$65), respectively. The cost of materials in the proposed concrete composition M14 is only 20% of that of the mix composition currently used in the industry and one-third of that of mix composition proposed earlier [Al-Mehthel M., Maslehuddin M., Hammad B., Al-Sharif Alaeddin A., Ibrahim M, (2014), Economical Heavy Concrete Weight Coating for Submarine Pipelines, U.S. Pat. No. 8,662,111, incorporated herein by reference in its entirety].

kg/m³) [Al-Mehthel M., U.S. Pat. No. 8,662,111], which leads to a reduction in material cost and greenhouse gas emission associated with the production of cement.

TABLE 7

Comparison of costs of different heavyweight concrete compositions

| Material | Material Cost/kg | 100% Iron Ore (Currently used in the industry) | | Partial Replacement of Iron Ore (Iron ore 40-45%) [*Ref] | | M13-6% Iron Ore (Disclosed Mix) | | M14-8% Iron Ore (Disclosed Mix) | |
|---|---|---|---|---|---|---|---|---|---|
| | | Material Required, kgs | Cost of Each Material, SR | Material Required, kgs | Cost of Each Material, SR | Material Required, kgs | Cost of Each Material, SR | Material Required, kgs | Cost of Each Material, SR |
| Iron Ore (Coarse Agg.) | 0.35 | 2752.26 | 963.291 | 1511.86 | 529.151 | 211.45 | 74.0075 | 265.81 | 93.0335 |
| Dune Sand (Fine Agg.) | 0.01 | 73.47 | 0.7347 | 105.17 | 1.0517 | 0 | 0 | 0 | 0 |
| Steel Slag (Coarse Agg) | 0.01 | 0 | 0 | 1012.29 | 10.1229 | 1638.75 | 16.3875 | 1594.83 | 15.9483 |
| Steel Slag (Fine Agg) | 0.01 | 0 | 0 | 0 | 0 | 792.95 | 7.9295 | 797.42 | 7.9742 |
| Cement | 0.3 | 640 | 192 | 525 | 157.5 | 400 | 120 | 400 | 120 |
| Water | 0.05 | 207.52 | 10.376 | 202.45 | 10.1225 | 152.67 | 7.6335 | 152.59 | 7.6295 |
| Total Cost of Each Mix in SAR | | | 1166 (US$310) | | 708 (US$190) | | 226 (US$60) | | 245 (US$65) |

*Ref: Al-Mehthel M., Maslehuddin M., Hammad B., Al-Sharif Alaeddin A., Ibrahim M, (2014), Economical Heavy Concrete Weight Coating for Submarine Pipelines, U.S. Pat. No. 8,662,111, incorporated herein by reference in its entirety Example 9

In the developed concrete mix, steel slag, an industrial byproduct, was utilized as coarse and fine particles. In addition, only 6 wt % to 8 wt % of iron ore was used as coarse aggregate. Steel slag accounts for a major proportion (about 75 wt %) of both coarse and fine aggregates. The unit weight and 7-day compressive strength of the heavyweight concrete is in the range of 200 to 204 pcf, and 62.5 to 74.5 MPa, respectively, which qualifies the heavyweight concrete as heavyweight concrete coating for submarine pipelines.

The advantages of the developed heavyweight concrete include:

i. A significant advantage of the mix design of the heavyweight concrete composition is based on its utilization of industrial byproduct abundantly available at close proximity to the pipe coating industry. Most of the constituent materials utilized in developing the disclosed heavyweight concrete are locally available.

ii. The heavyweight concrete composition uses only 4 to 8 wt % of iron ore as a constituent material, which may be imported or source locally. An effective utilization of industrial byproduct makes the price for the heavyweight concrete lower because the cost of materials for producing the heavyweight concrete is only 20% of the price of those currently used in the industry and one-third of the price of that proposed by Al Mehthal et al. [U.S. Pat. No. 8,662,111]. A lower price of producing the heavyweight concrete results in significant savings in the cost of coating submarine pipelines.

iii. An effective utilization of industrial byproduct helps conserve land potentially used for disposal of steel slag.

iv. A nominal amount of iron ore (e.g., 4% to 8%) used as a constituent material in the developed heavyweight concrete mix, contributes to the preservation of iron ore as raw materials for iron and steel making.

v. The quantity of cement (400 kg/m³) utilized in the heavyweight concrete mix is less than previously used (525 kg/m³) [Al-Mehthel M., U.S. Pat. No. 8,662,111], which leads to a reduction in material cost and greenhouse gas emission associated with the production of cement.

vi. The heavyweight concrete disclosed herein has a greater unit weight and a higher strength compared to those required for concrete heavyweight coatings for submarine pipelines.

The invention claimed is:

1. A heavyweight concrete composition, comprising:
   8-15 wt % cement;
   65-83 wt % steel slag; and
   3-10 wt % of an iron ore coarse aggregate, each relative to a total weight of the heavyweight concrete composition;
   wherein:
   the steel slag is present as a mixture of steel slag coarse particles having a particle size of 2-10 mm and steel slag fine particles having a particle size of 0.1-1.5 mm; and
   the iron ore coarse aggregate has a particle size of 3-7 mm.

2. The heavyweight concrete composition of claim 1, wherein a weight ratio of the steel slag coarse particles to the steel slag fine particles ranges from 1.5:1-3:1.

3. The heavyweight concrete composition of claim 1, wherein a weight ratio of the steel slag coarse particles to the iron ore coarse aggregate ranges from 4:1 to 20:1.

4. The heavyweight concrete composition of claim 1, wherein a weight ratio of the steel slag fine particles to the iron ore coarse aggregates ranges from 2:1 to 10:1.

5. The heavyweight concrete composition of claim 1, which comprises:
   45-55 wt % of the steel slag coarse particles; and
   20-28 wt % of the steel slag fine particles, each relative to a total weight of the heavyweight concrete composition.

6. The heavyweight concrete composition of claim 5, consisting essentially of the cement, the steel slag coarse particles, the steel slag fine particles, and the iron ore coarse aggregate.

7. The heavyweight concrete composition of claim 1, wherein 4-6 wt % of the iron ore coarse aggregate is present, relative to a total weight of the heavyweight concrete composition.

8. The heavyweight concrete composition of claim 1, wherein the cement is an ordinary Portland type I cement.

9. The heavyweight concrete composition of claim 1, wherein the steel slag comprises:

20-45 wt % of iron oxide;

3-10 wt % of aluminum oxide;

15-30 wt % of calcium oxide; and 3-18 wt % of silicon dioxide, each relative to a total weight of the steel slag.

10. The heavyweight concrete composition of claim 1, wherein the steel slag has a specific gravity of 3-4.

11. The heavyweight concrete composition of claim 1, wherein the steel slag has a water absorption of 0.5-5%.

12. The heavyweight concrete composition of claim 1, which is devoid of sand.

13. A wet concrete slurry, comprising:

the heavyweight concrete composition of claim 1; and 3-10 wt % of water relative to a total weight of the wet concrete slurry.

14. A heavyweight concrete, comprising a cured form of the wet concrete slurry of claim 13.

15. The heavyweight concrete of claim 14, which has a compressive strength of 60-80 MPa according to ASTM C39.

16. The heavyweight concrete of claim 14, which has a unit weight of 3,100-3,400 kg/m$^3$ according to ASTM C138.

17. The heavyweight concrete of claim 14, which has a unit weight 3-20% greater than a substantially identical concrete not formed with the iron ore coarse aggregate.

18. A method of making the heavyweight concrete of claim 14, the method comprising:

casting the wet concrete slurry in a mold to form a casted wet concrete; and curing the casted wet concrete thereby forming the heavyweight concrete.

19. The method of claim 18, wherein casting is performed at a temperature of 15-35° C.

\* \* \* \* \*